United States Patent [19]

Middlebrook

[11] 4,184,521

[45] Jan. 22, 1980

[54] APPARATUS FOR AND A METHOD OF APPLYING LAYERS OF FRIABLE MATERIAL

[75] Inventor: Paul J. Middlebrook, Selby, England

[73] Assignee: Monomech Developments Limited, South Kirkby, near Pontefract, England

[21] Appl. No.: 745,899

[22] Filed: Nov. 29, 1976

[30] Foreign Application Priority Data

Nov. 29, 1975 [GB] United Kingdom ............... 49151/75
Dec. 24, 1975 [GB] United Kingdom ............... 52904/75

[51] Int. Cl.² ............................................. B65B 1/04
[52] U.S. Cl. ........................................ 141/1; 141/284; 118/257; 47/1 A; 47/1.1
[58] Field of Search ................. 222/55; 141/284, 1–12, 141/250–283, 129–191; 100/151, 152, 153, 154; 118/257; 47/1.1, 1 A

[56] References Cited

U.S. PATENT DOCUMENTS 2,920,355  1/1960  Clark ........................................ 222/55

Primary Examiner—Houston S. Bell, Jr.
Attorney, Agent, or Firm—Fred Philpitt

[57] ABSTRACT

This invention pertains to an apparatus for applying layers of friable material on a belt, roller means over which the belt passes to define an upper reach for supporting the friable material to be deposited on said surface and a lower reach means for moving said roller means over the surface to be layered with the friable material, so that the belt passes over the roller means from the upper reach to the lower reach so that the belt can therefore drop friable material carried by the upper reach onto the surface to be layered.

8 Claims, 5 Drawing Figures

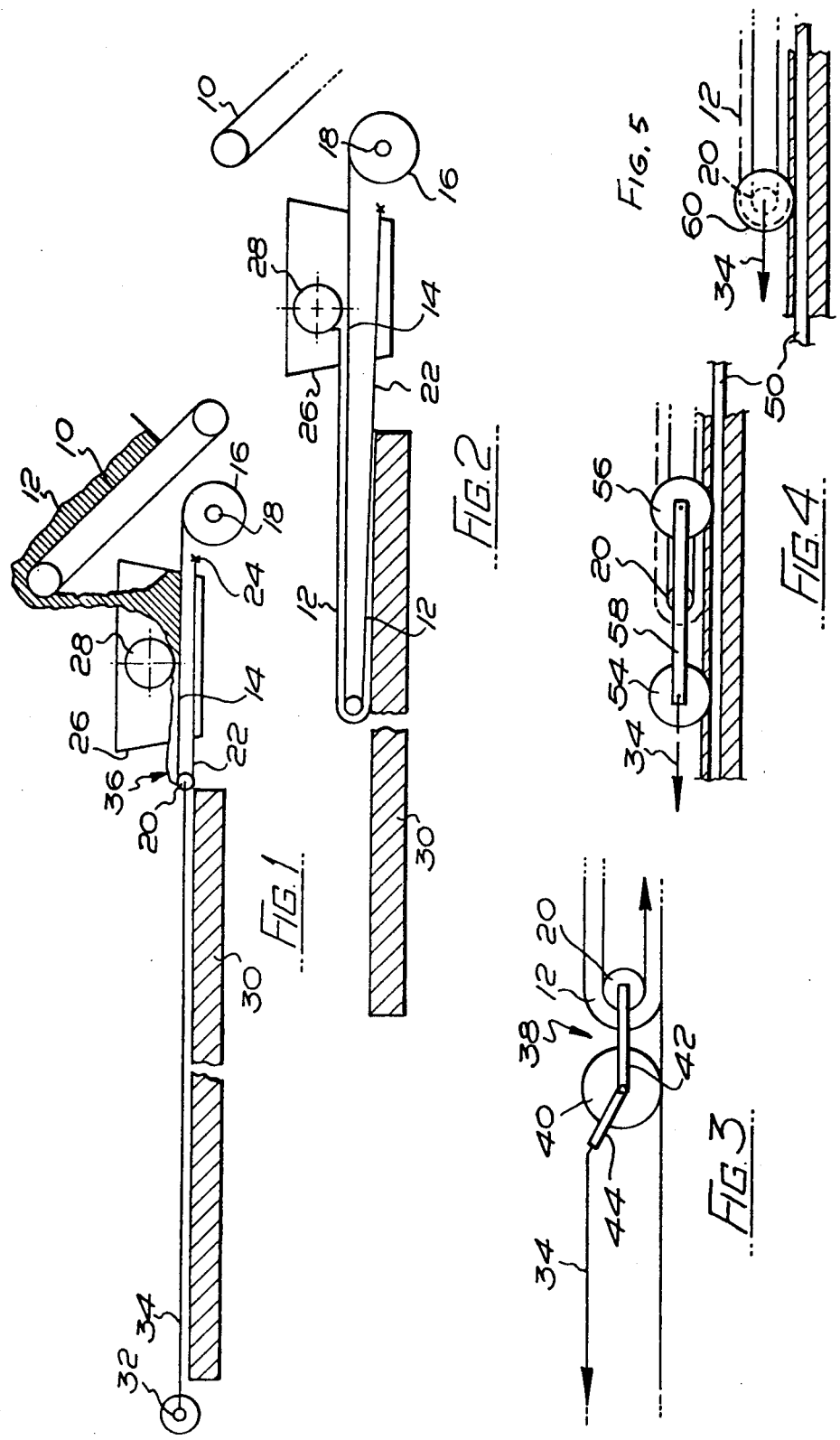

APPARATUS FOR AND A METHOD OF APPLYING LAYERS OF FRIABLE MATERIAL

In the growing of mushrooms, it is common practice to apply a layer of peat or other friable such as soil, over the compost bed, block or cake which contains the mushroom mycellium, as this layer improves the mushroom yield and quality. The layer can be applied at any time e.g immediately after formation of the bed, block or cake, or after spawning of two or three weeks after formation when the mycellium has spread through the compost. This layering practice is known as "casing". Heretofore, when peat is used, it has either been applied by hand, which is time consuming and costly and leads to uneven covering of the compost or by complicated machinery, which is certainly costly and often troublesome.

The present invention is concerned with an apparatus for and a method of performing this layering or casing, rendering hand casing unnecessary. The apparatus in its preferred form is simple in construction and can be used to apply layers of any friable material, despite the fact that it was conceived particularly to handle peat for application to mushroom compost.

In the one aspect of the invention, the apparatus for applying layers of friable material on a surface comprises a belt, roller means over which the belt passes to define an upper reach for supporting the friable material to be deposited on said surface and a lower reach means for moving said roller means over the surface to be layered with the friable material, so that the belt passes over the roller means from the upper reach to the lower reach so that the belt can therefore drop friable material carried by the upper reach onto the surface to be layered.

Preferably, the means for moving said roller means comprises a winch for pulling the roller means over the said surface.

Preferably, the lower reach is anchored to a fixed part of the apparatus, so that as the belt passes over the roller means the upper reach travels in the same direction as the roller means, but at twice the speed.

Preferably, the upper reach is associated with a feed device and a levelling device respectively for feeding the friable material into the said upper reach and for levelling the material on the upper reach as the upper reach moves past levelling device. The levelling device may be a rotatable drum which is rotated in use thereby to level the friable material and the feed means may comprise a conveyor.

The said lower reach may be permanently anchored to a stationary fitting, whilst the upper reach extends from belt stock carried by a rotatable spindle.

The roller means may be part of an assembly and the assembly may comprise a large diameter lead roller which runs on the surface to be layered whilst the roller means is a smaller diameter roller spaced from the large diameter roller to allow the friable material to fall therebetween.

The said assembly may be adapted to run on guide rails extending along side the bed to be covered, and to this end the guide assembly can be considered to be a trolley.

Also according to the invention there is provided a method of applying a layer of friable material over a surface wherein a belt having upper and lower reaches created by passing round a roller means is moved round the roller means in a direction from upper reach to lower reach as the roller means is moved over the surface thereby to apply friable material carried by said upper reach to said surface.

Preferably, the roller means from one end to another end of said surface, and in so doing causes the upper reach to move round the roller means, the lower reach being anchored, at said one end of the surface, at which the speed of movement of the roller means, thereby to deposit friable material from the upper reach onto said surface.

Alternatively, the upper reach may be anchored at the said other end of the surface during the movement of the roller means the lower reach being moved towards said other end to effect the movement of the roller means, and leaves the depositing of the friable material on said surface.

Embodiments of the invention will now be described by way of example, with reference to the accompanying drawing, wherein:

FIG. 1 is a diagrammatic side view of apparatus according to one embodiment of the invention;

FIG. 2 is a view similar to FIG. 1 but showing the apparatus in a different position;

FIG. 3 is a side view of a roller assembly of apparatus according to another embodiment of the invention; and FIGS. 4 and 5 respectively are side views of two further forms of roller assembly of apparatus according to other embodiments of the invention.

Referring to the drawings, the apparatus shown diagrammatically in FIGS. 1 and 2 comprises an inclined elevator 10 for raising friable material 12, in this case peat, to an elevated position from which it is dropped onto the upper reach 14 of a belt 16 wound on rotatable spindle 18. The reach 14 is horizontal and passes over roller means 20, the belt returning from the roller means 20 so as to define lower reach 22 which is anchored firmly at point 24 to a stationary fitting of the apparatus. Both reaches 14 and 22 pass through a hopper 26 which contains a levelling device in the form of a spinner drum 28, but the lower reach 14 need not pass through the hopper 26. It may be anchored at the point of the machine or to a shelf.

Reference No. 30 indicates a bed of compost to be layered with peat. When this compost is for growing mushrooms, it will contain the mushroom mycellium, and it is usual to apply the friable peat 12 in a carefully controlled thickness layer two weeks after the formation of the compost bed 30.

The apparatus additionally has a winching means 32 which may be a conventional winch motor and drum, and this is located at the opposite end of the bed 30 from the components of the apparatus already described. A pulling wire, belt, cord, net 34 or the like is connected between the winching means 32 and the roller means 20 whereby such roller means can be pulled from one end of the bed 30 and over the upper surface thereof. It is to be noted that the width of the belt 16 should preferably be equal to the width of the compost bed 30 to ensure that all of the upper surface thereof is covered with friable material 12.

In operation the drum 28 is caused to spin, and the roller means 20 is pulled over the upper surface of the block 30 by the winch means 32. As the lower reach 22 is anchored, so the upper reach 24 will travel at twice the speed of the roller means 20 and in the same direction. This causes the belt to pass over the roller means 20, and also to take with it the friable material 12 as indicated at 36 in FIG. 1. The upper reach of belt 14 and the drum 28 are carefully positioned one relative to another to ensure that there is an even layer of friable material on the upper surface of belt 14. As the roller 20 moves over the block 30, so the friable material, in controlled quantity, is applied over the upper surface of the block as shown in FIG. 2. When the roller 20 has moved half way along the length of the block 30, the supply of friable material from elevator 10 is stopped, to ensure that only the correct amount of friable material is applied over the compost bed surface. When the roller means 20 reaches the opposite end of the bed 30, it is either removed, and the belt 16 rewound onto spindle 18 by rotation of spindle 18 in the opposite direction or the roller means 20 is carried back to the initial position by such rewinding.

If the surface of bed to be covered is uneven, and the roller means 20 is simply allowed to travel over and in contact with such surface, as in the FIGS. 1 and 2 embodiment, it can happen that the amount of compaction of the friable material layered onto that surface will vary from place to place. The arrangement shown in FIG. 3 is designed to overcome this difficulty, and it will be noticed that the assembly indicated by numeral 38 includes the roller means 20 in the form of a small diameter idler roller, and a large lead roller 40. These two rollers are spaced apart but coupled by a bracket 42 to allow the friable material 12 to pass between the rollers 20 and 40. The pulling force applied by the cable 34 is to the end of an upwardly inclined arm 44 so that the resulting force on the roller 40 will be to keep it in pressure contact with the surface on which it rolls, and there will be a tendency to keep the roller 20 raised out of contact with that surface. By this arrangement, an even layer of friable material 12 is applied on the bed surface. The roller 40 may be provided with shrouds at the ends thereof to prevent it fouling with the framework supporting the compost. The density of the layering can be adjusted by adjusting the position on the arms 44 on which the pulling means 34 acts.

Instead of the lower reach 22 being anchored as shown, it may also be wound on a rotatable spindle similar to spindle 18, the friable material would be applied by un-winding both spindles at the same time, so that the friable material 12 remains on the top reach 14 until roller 20 reaches the end of the bed. Then the spindle 18 is locked and the belt would back on the other spindle only. Thus, the roller 20 is moved back, the belt 16 is fed round roller 20 and the friable material deposits on the bed 30 during such return of roller 20.

In the embodiments of the roller assembly shown in FIGS. 4 and 5, the assembly is designed to run on rigid tracks so extending alongside the bed 30. In FIG. 4 the assembly comprises a four wheeled trolley 52 having front and rear pairs of wheels 54, 56 which run on tracks 50 and the roller 20 is carried by the trolley frame 58 between the wheel pairs 54, 56. The roller 20 is adjustable vertically and horizontally of the frame 58 depending upon the thickness of layer 12 being applied.

The assembly of FIG. 5 comprises a pair of wheels 60 which run on the tracks 50 and the roller 20 is supported by and between the wheels 60 as shown. The roller 20 may be made vertically adjustable relative to the wheels 60 and or the rails may be adjustable vertically (also in the FIG. 4 arrangement) to suit the thickness of layer 12 being applied. It is convenient to use the rails 50 for supporting the trolley as they may also serve for supporting other apparatus such as harvesting apparatus which is required to be moved along such rails.

It will be appreciated that the structure or format of the belt 14 will depend upon the particular application, and that the apparatus can be used for the layering of any suitable friable material on any surface so to be layered.

What we claim is:

1. In an installation requiring the application of layers of friable material on a substantially horizontal surface, apparatus comprising
   (a) a belt for applying the friable material to the surface;
   (b) roller means over which the belt passes to define (i) an upper reach of said belt for supporting the friable material prior to its deposition on said surface, and (ii) a lower reach located under said upper reach;
   (c) feed means for applying friable material to said upper reach;
   (d) displacement means for moving said roller means over said surface from a first edge towards a second edge; and
   (e) suspension means supporting the belt and ensuring that it travels round the roller means from the top reach to the bottom reach by virtue of the roller movement over the surface from the first edge to the second edge, whereby friable material carried by the top reach will be moved with the top reach, be deposited on said surface and travelled over by said roller means as the roller moves from the first edge to the second edge.

2. Apparatus according to claim 1 wherein the means for moving said roller means comprises a winch for pulling the roller means over the said surface.

3. Apparatus according to claim 1 wherein the suspension means includes an anchorage to which the lower reach is anchored so that as the belt passes over the roller means the upper reach travels in the same direction as the roller means, but at twice the speed.

4. Apparatus according to claim 1 wherein the roller means is part of a roller assembly comprising a large diameter lead roller which runs on the surface to be layered while the roller means is a smaller diameter roller spaced from the large diameter roller to allow the friable material to fall therebetween.

5. Apparatus according to claim 1 wherein the roller means is part of a roller assembly which is adapted to run on guide rails extending alongside the surface to be covered.

6. A method of applying layers of friable material over a surface wherein a belt having upper and lower reaches created by passing round a roller means is moved round the roller means in a direction from upper reach to lower reach as the roller means is moved over the surface thereby to apply friable material carried by said upper reach to said surface.

7. A method according to claim 6 wherein the roller means moves from one end to another end of said surface, and in so doing causes the upper reach to move round the roller means, the lower reach being anchored at said one end of the surface at which the speed of movement of the roller means, thereby to deposit friable material from the upper reach onto said surface.

8. A method according to claim 6 wherein the upper reach is anchored at the said other end of the surface during the return of the roller means, the lower reach being moved towards said other end to effect the return of the roller means, leaving the friable material on said surface.

* * * * *